United States Patent Office 3,641,131
Patented Feb. 8, 1972

3,641,131
HYDROLYSIS OF OLEFIN-SULFUR TRIOXIDE REACTION PRODUCT MIXTURES
David M. Marquis, Orinda, and William A. Sweeney, San Rafael, Calif., assignors to Chevron Research Company, San Francisco, Calif.
No Drawing. Continuation-in-part of application Ser. No. 528,074, Feb. 17, 1966, and a continuation of application Ser. No. 591,712, Nov. 3, 1966. This application Mar. 19, 1969, Ser. No. 809,485
Int. Cl. C07c *143/16*
U.S. Cl. 260—513 R     5 Claims

ABSTRACT OF THE DISCLOSURE

Improved and novel n-α-olefin sulfonate detergents are obtained when a crude α-olefin-sulfur trioxide reaction product is hydrolyzed substantially completely at a temperature above about 145° C.

---

This application is a continuation-in-part of application Ser. No. 528,074, filed Feb. 17, 1966, now abandoned, and a continuation of application Ser. No. 591,712, filed Nov. 3, 1966, now abandoned.

This invention relates to surface active aliphatic sulfonates and to an improved process for their production. More particularly, it relates to an improved method for the hydrolysis of aliphatic sulfonate product mixtures obtained by the reaction of sulfur trioxide with monoolefinic hydrocarbons. Still more particularly, it relates to hydrolysis of the products of reaction of $SO_3$ with straight chain 1-olefins herein referred to as α-olefin sulfonate product mixtures and concentrates thereof.

The reaction of sulfur trioxide with an aliphatic olefin results in a complex product mixture which includes sultones, aliphatic sulfonic acids and some polysulfonated material. It is known in the art to neutralize this complex mixture and to convert it to useful surface active sulfonate detergent product. However, materials prepared by the prior art methods suffer in comparisons with alkylaryl sulfonates familiar to the trade in that performances in certain important regards are inferior. On the other hand, the use of aliphatic sulfonates by the trade is very desirable because in general they appear to be quantitatively degraded biologically. Undesirable accumulations of detergent wastes in ground water can therefore be eliminated by the use of aliphatic sulfonates rather than the alkylaryl sulfonates from which aromatic and some surface active residues are known to persist after biological attack.

A problem incidental to the production of high concentrations of higher molecular weight α-olefin sulfonates, e.g., $C_{15}$–$C_{18}$ α-olefin sulfonates, is found in the tendency of concentrated solutions thereof to gel and become difficult to process. This difficulty can be avoided by substantial dilutions of the product mixture, but on the other hand the process water added is a disadvantage in drying operations, in shipping the sulfonate, and in formulating liquid compositions as described in the art.

It has now been found that aliphatic surface active sulfonates having substantially improved detergent properties can be prepared from the hydrolysis of the strong base neutralized product of the reaction of sulfur trioxide with a $C_{10}$–$C_{20}$ monoolefinic hydrocarbon by a hydrolysis which is effected essentially completely at a temperature in the range from about 145 to 200° C. and at a pressure sufficient to maintain the neutralized product in the slurry phase.

We have found that, surprisingly, the product obtained from a high temperature fast hydrolysis of the neutralized sulfonate slurry is markedly superior to the product obtained from a low temperature slow hydrolysis. In order to satisfactorily minimize the slow hydrolysis product, the time interval in taking the neutralization product up to hot hydrolysis temperature must be less than about ten minutes and preferably less than one minute.

A further advantageous aspect of the subject invention derives from the use of direct injection of superheated steam to accomplish the fast heat-up required to effect the desired high temperature hydrolysis. The added steam quickly and uniformly heats the reaction mixture. It also dilutes the mixture to a concentration below interferring gel formation conditions during the hydrolysis stage. Gel formation is usually a complex phenomenon. In the present process system it appears to be dependent upon a number of process factors including in some degree the sulfonation conditions, the cation of the neutralized sulfonate, etc.; but in general it occurs in the range of sulfonate concentrations above from about 43 (weight) to 55 percent in the present α-olefin sulfonates. After completion of the hydrolysis, the slurry is reconcentrated by reducing the system pressure and flash evaporating out excess water, for example, for the production of slurries having at least about a 50 weight percent concentration of sulfonate active useful for the production of the liquid detergent compositions of commerce.

By rapid heating is meant in general a time interval of less than about ten minutes, preferably less than one minute, in heating the sulfonate neutralization product from a temperature where little or no hydrolysis occurs to a temperature in the range above about 145° C. and below about 200° C., preferably below 175° C. That is to say, a rapid heat-up for purposes of hydrolysis is one accomplished at a rate of at least 12.5° C. per minute. The preferred rate is in the range above about 75° C. per minute.

Sulfur trioxide-α-olefin reaction products are in general useful feeds for the subject process. Preferred feeds are those obtained by the reaction of dilute sulfur trioxide with 1-alkenes at a temperature below about 50° C. The latter have in particular relatively superior color and odor characteristics over similar products obtained under more vigorous reaction conditions. Dilutions accomplished by the use of relatively inert gas admixing as by air, carbon dioxide, sulfur dioxide, nitrogen and the like or by reduced pressure systems are in general convenient and are contemplated.

In a preferred embodiment of the invention a $C_{15}$–$C_{18}$ cracked wax α-olefin sulfonate mixture, for example, as obtained in a continuous reactor from the reaction of vaporized and air diluted sulfur trioxide with the olefin at about 15–40° C., is passed into a hydrolysis zone from the sulfonator with the line addition of aqueous alkali of about the stoichiometric requirement for neutralization and hydrolysis. The heat of neutralization may raise the transfer line mixture to a temperature of about 45–65° C. in the absence of external cooling.

The hydrolysis zone is a second transfer line reactor, and it is fitted for operation at elevated pressures and sized for an average residence time at about 150° C. of five to ten minutes. At the input end of the hydrolyzer the neutralized slurry is introduced and simultaneously mixed with superheated steam in an amount sufficient to immediately raise the temperature of the introduced slurry to about 150° C. and sufficient to maintain the concentration of the sulfonate below gel formation values.

As a representative example, a neutralized $C_{15}$–$C_{18}$ sulfonate slurry at 44° C. containing about 55 percent water and 45 percent of a mixture of sulfonate and hydrolyzables is introduced into the hydrolyzer line (65 feet of 12″ 316 SS pipe) at the rate of about 7740 lbs. per hour. Simultaneously saturated steam at 178° C. and 125 p.s.i.g. is introduced into the hydrolyzer reactor and into admixture with the neutralizer feed at the rate of 1000 lbs. per hour, thereby raising the temperature of the resulting mixture to 155° C. and lowering the concentration of sulfonate to about 40 weight percent. The entrance pressure to the hydrolyzer is about 100 p.s.i.g., and the exit pressure is about 65 p.s.i.g., i.e., sufficient to maintain slurry phase at a temperature in excess of 150° C. After about a ten-minute average residence time in the hydrolyzer the product is withdrawn and the pressure reduced to 2 p.s.i.a. via a pressure let down means as in a flash-pot or vapor-liquid separator. About 1260 lbs. per hour of excess water is thereby evaporated from the hydrolysis product, resulting in the production of $C_{15}$–$C_{18}$ α-olefin sulfonate slurry having a concentration of active of about 47 weight percent.

The following examples further illustrate the invention.

EXAMPLE 1

Slow heat-up and hydrolysis

Into a glass vessel suitable for use at moderate pressures and fitted with pressure and temperature sensors and a means for stirring was charged an aliquot of a $C_{15}$–$C_{18}$ α-olefin sulfonation product obtained by the reaction air diluted $SO_3$ with the corresponding α-olefin mixture at a temperature below about 50° C. Sufficient aqueous sodium hydroxide was added for neutralization of free sulfonic acid and potential sulfonic acid from the hydrolysis of the hydrolyzables present in the charge. The vessel was then sealed and slowly heated by suitable means to 150° C. and maintained at this temperature with stirring for fifteen minutes. The time taken to reach 150° C. was thirty minutes. The reaction vessel and contents were then cooled to room temperature, ca 22° C., and the product analyzed. Based upon the detergent active content, it contained 2.9 weight percent of neutral oil. As described subsequently (Example 4), the resulting product was tested for detergency in a standard dishwashing test.

EXAMPLE 2

Fash heat-up and hydrolysis

As in Example 1, a further aliquot of the $C_{15}$–$C_{18}$ α-olefin sulfonate was hydrolyzed at about 150° C. except that the feed was introduced into a continuous stainless steel coil reactor having an 0.43-inch inside diameter and a length of fifteen feet. The reactor was fitted with a high pressure positive displacement feed pump, a terminal pressure relief means for let down to atmospheric pressure, and a temperature control means for maintaining the reactor and contents at 150° C.

The feed rate was adjusted to provide for a ten minute reactor residence time at temperature.

The resulting hydrolysis product was analyzed as before and found to cotain 2.8 percent of oil, and the product was evaluated by the same detergency test as in Example 1, and the results were as listed below in Example 4.

EXAMPLE 3

Steam injection and fast hot hydrolysis

In an apparatus essentially as in Example 2 and using the same feed, the hydrolysis was repeated except that dry superheated steam was substituted for the heating means, and the reactor coil was suitably insulated to minimize heat loss. Along with the slurry feed to which the same relative amount of sodium hydroxide had been added, dry steam was fed to the reactor at 120 p.s.i.g. and at a temperature sufficient to substantially immediately raise the temperature of the reactor and charge to 150° C. The product was equivalent in all essential details to that of Example 2, except that when more concentrated sodium hydroxide solution was used to provide the stoichiometric requirement of base, the resulting product had a higher concentration of detergent active in the slurry.

EXAMPLE 4

Hand dishwashing test

Aliquots of the product obtained in Examples 1 and 2 were tested for detergency in a standard foam test. In the test, dinner dishes or plates having a diameter of nine inches are washed under conditions simulating home dishwashing. The results are reported as the total number of plates washed before the foam generated in the test collapses.

The aliquots are compounded into a built detergent composition having the following analysis:

|   | Weight percent |
|---|---|
| Sodium salt of active | 25 |
| Trisodium polyphosphate | 40 |
| Sodium silicate | 7 |
| Carboxy methyl cellulose | 1 |
| Sodium sulfate | 19 |
| Water | 8 |
|   | 100 |

In this test the dishes are smeared with molten, partially hydrogenated vegetable oils, melting point of 110–115° F., treated with a dye, such as Sudan Red Dye to impart a uniform appearance to the grease. Using a syringe, 2.2 cc. of the molten soil is placed in the center of each clean, dry dinner plate. With the fingers, the soil is spread over a space of about 6.5 inches in diameter on each plate.

Five thousand eight hundred fifty ml. of washing water adjusted to the desired hardness and at a temperature of 117° F. are placed in an 8000 ml. container having a faucet outlet in the base. Samples of the built detergent to be tested are made up into 6% solutions, and 150 cc. of each solution is added to a dishpan 13.5 inches in diameter and 5.75 inches deep thereby giving a final concentration of 0.15% by weight.

The water container is then placed above the dishpan in such a position that the distance between faucet outlet and bottom of the dishpan is 18 inches. Further, the dishpan is so placed that the stream of water strikes the center of the dishpan. The water from the container is drained into the dishpan with the water faucets fully open. This requires about 45–60 seconds. When the dishpan is completely charged, washing of the dishes is begun.

Five soiled plates and a clean dishcloth are then placed in the dishpan. The dishes are washed in a circular manner to remove the grease from the front of the plate, then turned over and the grease clinging to the back is removed in the same way. During the washing, each plate is held at an angle so that almost one-half of the plate is kept under the washing solution. This is repeated until the five plates are washed. Another set of five plates is then placed in the dishwater and washing continued, this procedure being repeated until the foam collapses in the dishpan. At this point the surface is nearly devoid of foam. A detergent formulation capable of washing at least twenty plates and preferably at least twenty-four plates is regarded as suitable. The results obtained with the test samples are tabulated below.

| Sample: | Plates |
|---|---|
| Example 1 | 21 |
| Example 2 | 24 |

The foregoing examples demonstrate that rapid heat-up and hot hydrolysis at elevated temperatures and pressures substantially improve the foaming properties and detergency of aliphatic hydrocarbon olefin sulfonates. An additional feature is that reducing the pressure on the slurry without any cooling results in desirable inspissation of the slurry. A further feature of the resulting product is its very low oil content eliminating any necessity for a costly deoiling step.

While $C_{15}$–$C_{18}$ α-olefin sulfonates were used in the foregoing examples to demonstrate the subject invention, sulfonates obtained from $C_{10}$-$C_{20}$ aliphatic monoolefinic hydrocarbons in general are contemplated as useful feeds for the inventive process. The n-1-alkene α-olefin sulfonates are preferred feeds.

Other and obvious variations of the invention over those demonstrated in the above examples will be readily understood by the art in view of the disclosure including other rapid heating means, temperature gradients and schedules within the disclosed useful range, and the like. Therefore, it is not intended that these examples be limiting.

We claim:

1. In the production of olefin sulfonates by the reaction of sulfur trioxide and an olefin followed by alkaline neutralization and hydrolysis, the improvement which comprises first adding about the stoichiometric requirement of alkali for the neutralization and hydrolysis of said reaction product while maintaining the resulting mixture at a temperature in the range from about 45° C. to 65° C., said hydrolysis being carried out by simultaneously introducing the mixture and super-heated steam into a hydrolysis zone, thereby raising said mixture to a temperature in the range from about 145° C. to about 200° C., said rise being effected in a time interval of less than about one minute while maintaining the concentration of the sulfonate in the steamed mixture in the range below about 43 to 55 weight percent.

2. The improvement as in claim 1 further characterized in that said alkali is aqueous sodium hydroxide.

3. The improvement as in claim 1 further characterized in that the resulting hydrolyzed reaction mixture is introduced into a pressure let-down means wherein water is removed from the hydrolyzed mixture by evaporation.

4. The improvement as in claim 1 further characterized in that the neutralized mixture contains about 45 weight percent of the sulfonation product and has a temperature of about 44° C., in that said steam at the introduction thereof into the hydrolysis zone has a temperature of about 178° C. and a pressure of about 125 p.s.i.g., and in that said sulfonate concentration during hydrolysis is about 40 weight percent.

5. The improvement as in claim 4 further characterized in that the resulting hydrolysis product is passed into a zone maintained at a reduced pressure wherein water is evaporated from the product.

References Cited

UNITED STATES PATENTS

| | | | |
|---|---|---|---|
| 2,316,670 | 4/1943 | Colgate et al. | 260—513 |
| 3,488,384 | 1/1970 | Kessler et al. | 260—513 |

FOREIGN PATENTS

| | | | |
|---|---|---|---|
| 1,215,695 | 5/1966 | Germany | 260—513 |

DANIEL D. HORWITZ, Primary Examiner